(12) United States Patent
Woods et al.

(10) Patent No.: US 7,136,379 B2
(45) Date of Patent: Nov. 14, 2006

(54) MULTIPLE-INTERFACE PORT MULTIPLEXER

(75) Inventors: Gregory K. Woods, Carlsbad, CA (US); Clifton E. Scott, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/974,919

(22) Filed: Oct. 10, 2001

(65) Prior Publication Data

US 2003/0072303 A1 Apr. 17, 2003

(51) Int. Cl.
*H04L 12/50* (2006.01)
*H04L 12/28* (2006.01)

(52) U.S. Cl. ...................... 370/360; 370/412

(58) Field of Classification Search ............... 357/357, 357/359, 360, 380, 384, 385; 370/236, 427, 370/429
See application file for complete search history.

(56) References Cited

U.S. PATENT DOCUMENTS

| | | | |
|---|---|---|---|
| 4,866,667 A | 9/1989 | Shimada | 364/900 |
| 5,933,449 A * | 8/1999 | Meyer | 375/219 |
| 5,991,296 A * | 11/1999 | Mu et al. | 370/380 |
| 6,138,185 A | 10/2000 | Nelson et al. | 710/33 |
| 6,195,335 B1 * | 2/2001 | Calvignac et al. | 370/236 |

FOREIGN PATENT DOCUMENTS

| | | |
|---|---|---|
| DE | 29820191 | 1/1999 |
| EP | 0505695 | 9/1992 |
| EP | 0723233 | 7/1996 |

* cited by examiner

*Primary Examiner*—Huy D. Vu
*Assistant Examiner*—Daniel Ryman
(74) *Attorney, Agent, or Firm*—Philip Wadsworth; Charles D. Brown; Howard H. Seo

(57) ABSTRACT

A device for interconnecting and multiplexing a plurality of interfaces is disclosed. In the preferred embodiment, three serial communications ports are interfaced such that any two may be interconnected for communications. A novel circuit comprising a plurality of buffers is employed to allow selection of the interconnection scheme by a controller. The design is scalable and is characterized by low cost, low printed circuit board area requirements, and graceful function. In the preferred embodiment, a PDA, wireless transceiver, and cradle interface of a personal communications device are effectively interconnected and multiplexed.

14 Claims, 4 Drawing Sheets

MULTIPLE-INTERFACE PORT MULTIPLEXER

BACKGROUND OF THE INVENTION

1. Field of the Invention

The present invention relates to digital circuits. More specifically, the present invention relates to systems and methods for multiplexing a plurality of communication resource interfaces.

2. Description of the Related Art

Modern electronic devices continue to evolve into ever-higher levels of integration. While devices used to implement a given electronic function were once wired together from discrete components, now, highly integrated 'chips' are produced to consolidate the discrete components and functions into a single package. This lowers cost, reduces size and makes more reliable product manufactured in this manner. Examples of such highly integrated devices include wireless telephones, personal digital assistants, radio transceivers, media recorders and players, device controllers and all kinds of other devices and functions.

Today, designers of integrated systems that combine more than one of these integrated devices into a single product are faced with the task of integrating integrated devices. For example, if a designer wishes to integrate a wireless telephone and a personal digital assistant, they must design a circuit for accomplishing such integration or create an entirely new integrated device which incorporates all the components and functions desired for the integrated product. The latter approach may be an expensive and risky investment in an emerging market.

Aside from sharing power supply and ground circuits, highly integrated devices must communicate in some fashion because there is usually a software application dedicated to each integrated device. To yield a gracefully functioning integrated product, it is necessary to integrate both the hardware and the software. This usually implies a parallel or serial communications port interconnecting the two integrated devices. This can be straight forward in the case where two devices are integrated into a product. Serial communications protocols and physical interfaces are often times preferred because a smaller quantity of printed circuit board area is required to route the relatively fewer circuit traces. However, where there are more than two devices integrated into a product, the connection of a plurality of interfaces are more problematic.

Where three or more integrated devices are integrated into a product, the designer must design a communications interface, or multiplexing circuit that not only interconnects the various devices, but also deals with issues of contention between the devices that inevitably arise. Of course, the design of such circuitry is within the ability of many designers, given there are not great limitations placed on cost, development time, and printed circuit board area required. However, this is rarely the case. In modern, highly integrated, devices that compete in open markets, there is always a great pressure to hold size and cost down, while at the same time providing short product development cycles and good reliability.

Thus there is a need in the art for a low cost device for interconnecting and multiplexing three or more interfaces among devices.

SUMMARY OF THE INVENTION

The need in the art is addressed by the apparatus and methods of the present invention. In one embodiment, an apparatus for selectively interconnecting a plurality of ports is taught. It comprises a cross-bar switch, having a plurality of bidirectional data ports, and a controller, operable to control the cross-bar switch to interconnect any two of said plurality of bi-directional data ports. In a refinement of this, the plurality of bi-directional ports are adapted to interconnect RS-232 ports. In further refinement, the cross-bar switch is implemented with a plurality of digital buffers.

In another embodiment, an apparatus for interconnecting three bi-directional interfaces is taught. The apparatus comprises a first, second, and third interface each having an input and an output, and an interface controller having a first, second, and third control outputs, and operable to enable any one of the outputs individually. Also, a first, second, third, fourth, fifth, and sixth buffer, each having an input, an output, and a control input, and wherein the control inputs enable and disable the coupling of signals through the buffers. The output of the first and second buffers are coupled to the input of the first interface, and, the outputs of the third and fourth buffers are coupled to the input of the second interface, and, the outputs of the fifth and sixth buffers are coupled to the input of the third interface. Similarly, the output of the first interface is coupled to the input of the fourth and fifth buffer, and, the output of the second interface is coupled to the inputs of the first and sixth buffers, and, the output of the third interface is coupled to the inputs of the second and third buffers. Also, the first control output is coupled to the control inputs of the first and fourth buffers, and, the second control output is coupled to the control inputs of the third and sixth buffers, and, the third control output is coupled to the control inputs of the second and fifth buffers.

In a refinement to the foregoing, disabling the control inputs sets the outputs of the buffers to a high impedance state, and the interface controller is operable to disable all of the control outputs. In a further refinement, the interfaces are serial port interfaces. And more specifically, the serial port interfaces are RS-232 serial port interfaces. The invention is applicable when output of the serial port interface is a transmit data output, and the input of the serial port interface is a receive data input. And also, when the output of the serial port interface is a request to send output, and the input of the serial port interface is a clear to send input.

It is also taught that the interface controller is incorporated into one of the interfaces.

The foregoing embodiment is with regard to the specific case of interconnecting three interfaces. The present invention also teaches a general case that can be applied to any number of interfaces, that is the number n interfaces. This is accomplished with an apparatus, comprising a plurality of n interfaces, each having an input and an output, and a plurality of n times (n−1) buffers, each having an input, an output, and a control input, and wherein the control inputs enable and disable the coupling of signals through the buffers, respectively. Also, an interface controller having a plurality of ($_nC_2$) control outputs, and operable to enable any one of the plurality of outputs individually. The expression ($_nC_2$) is the number of unordered combinations of 2 interfaces taken from a total of n interfaces. Mathematically, it is read as "n choose 2". In this general case, the outputs of a unique (n−1) of the plurality of buffers are coupled to the input of each one of the plurality of interfaces, and, every one of the outputs of the plurality of interfaces is uniquely coupled to the input of one of the (n−1) plurality of buffers that are coupled to the inputs of every other of the plurality of interfaces, such that the output of every interface is coupled to the input of every other interface through a unique one of the plurality of buffers. Further, each one of the plurality of control outputs is coupled to the control inputs of the two of the plurality of buffers that couples a unique pair of the ($_nC_2$) combinations of the interface inputs and outputs.

In a refinement to the general case, it is taught that disabling the control inputs sets the outputs of the buffers to a high impedance state, and the interface controller is operable to disable all of the control outputs. In a further refinement, the interfaces are serial port interfaces. And more specifically, the serial port interfaces are RS-232 serial port interfaces. The invention is applicable when output of the serial port interface is a transmit data output, and the input of the serial port interface is a receive data input. And also, when the output of the serial port interface is a request to send output, and the input of the serial port interface is a clear to send input.

It is also taught that the interface controller is incorporated into one of the interfaces.

DESCRIPTION OF THE INVENTION

Illustrative embodiments and exemplary applications will now be described with reference to the accompanying drawings to disclose the advantageous teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
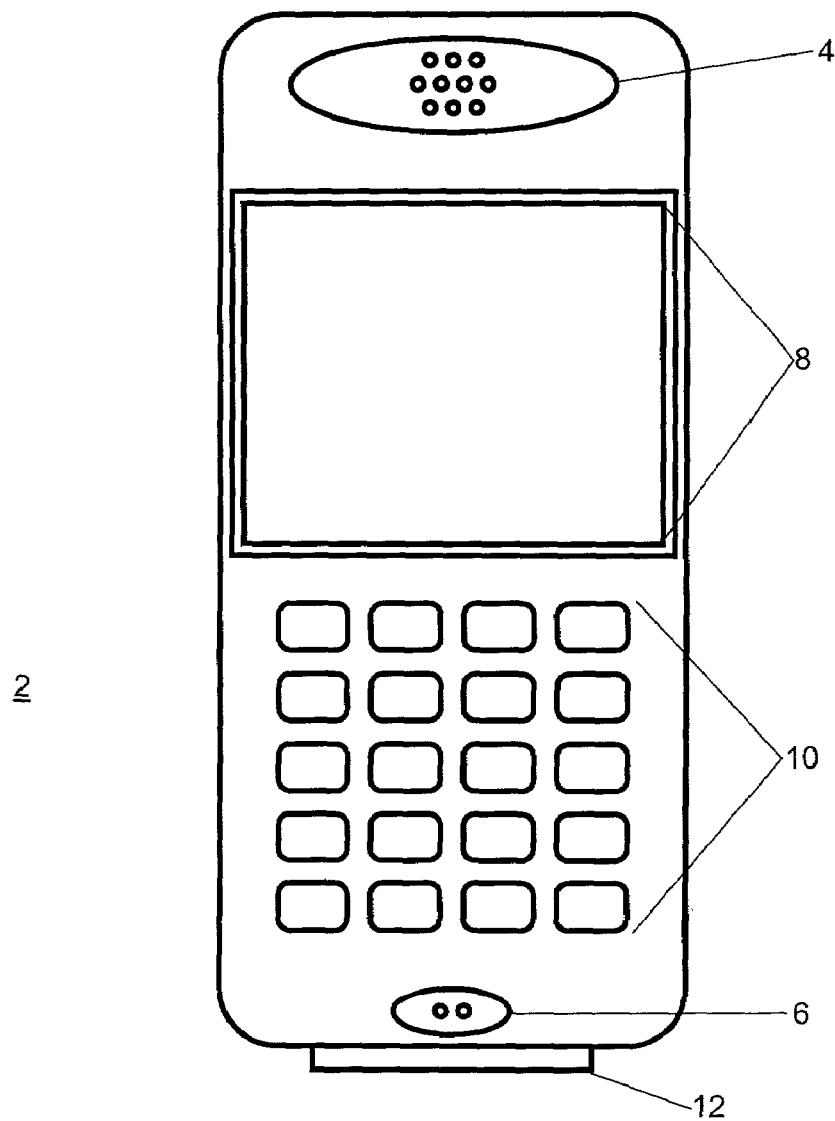
FIG. 1 is a drawing of an illustrative embodiment portable device implementation of the present invention.

Reference is directed to FIG. 1, which is a drawing of a personal wireless communications device 2 in the preferred embodiment of the present invention. This device 2 incorporates a wireless telephone and a personal digital assistance (hereinafter 'PDA'). The telephone functions are implemented using the earphone 4 and microphone 6, as is traditionally done in wireless telephones. Also, a keypad 10 is used for dialing telephone numbers, placing calls, and generally to operate the wireless telephone functions. In the preferred embodiment, the wireless telephone utilizes a spread spectrum transceiver according to the IS-95 CDMA protocol.

The device 2 also incorporates a PDA, which primarily uses a liquid crystal display 8 as the output device, and may include a touch screen input function as well. The keypad 10 is also used to operate some of the PDA functionality. Since a device such as this is capable of storing and manipulating a large amount of data, it is useful to store a back-up copy of such data so that loss or damage to the device does not result in a total loss of the data stored therein. The back-up storage function is accomplished through an interface connector 12. In the preferred embodiment, the interface connector 12 couples to a mating connector in a docking cradle.

Figure 2:
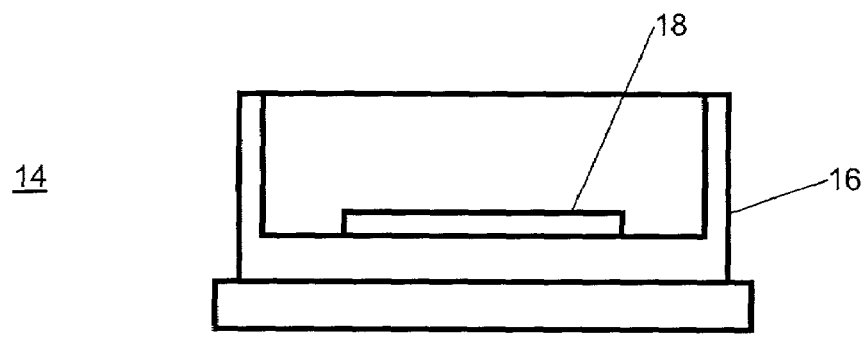
FIG. 2 is a drawing of the cradle unit of an illustrative embodiment implementation of the present invention.

FIG. 2 illustrates a docking cradle 14 in the preferred embodiment. The docking cradle 14 comprises a structure 16 adapted to sit on, or be mounted to, a surface (not shown). The structure 16 is adapted to accept a portion of the wireless device 2 and to generally support the device 2 when it is inserted into the structure 16. Within the cradle 16 is a connector 18 that is adapted to interconnect electrical signals with the connector 12 in the wireless device 2. In addition, the cradle 14 is adapted to interface to a computing device, such as a personal computer, so that signals interfaced between the wireless device 2 and the cradle 14 can be further coupled into the computing device (not shown) allowing the data to be stored in the computing device. In the preferred embodiment, the electrical interface between the device 2 and the cradle 14 comprises a serial communications path, in addition to other electrical signals. The serial communications path operates in accordance with the EIA/TIA RS-232 serial communications physical interface and protocols, as is well under stood by those of ordinary skill in the art.

The functional components inside the wireless communications device 2 include one or more microprocessors or microcontrollers, or simply 'controllers', and a wireless transceiver, as well as a PDA device. In addition, several other functional components are employed to deliver the various required functions. While there exists a very high level of component integration in wireless personal communications devices, there has not yet been achieved total integration into a single semiconductor device all of the functions needed of the PDA, wireless telephone and related functionality. This is typically the case where two or more basic functional systems are combined, as is the case with the preferred embodiment where a wireless telephone and PDA have been integrated.

Figure 3:
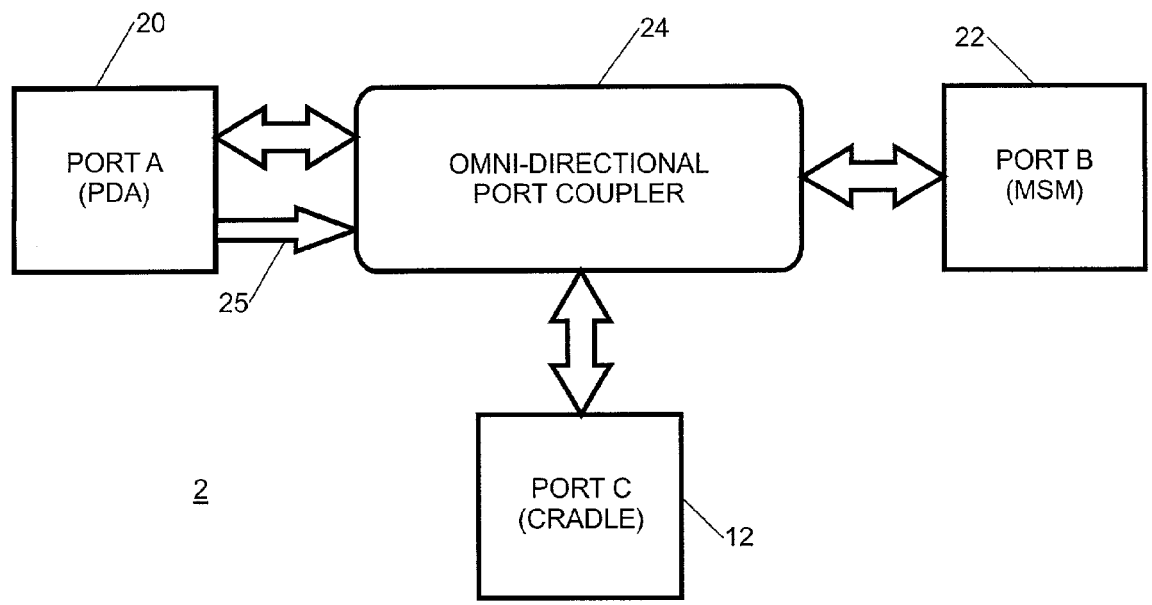
FIG. 3 is a functional block diagram of an illustrative embodiment of the present invention.

Reference is directed to FIG. 3, which is a functional block diagram of some of the components utilized in the preferred embodiment. A PDA device 20 is represented by a communications interface, or port, item 20 in FIG. 3. The wireless telephone in the device is represented by the communications port 'B' 22 which couples to mobile station modem (hereinafter 'MSM'). The MSM operates to provide a vast portion of the wireless telephone functionality in the preferred embodiment device and is the primary point of interface between the wireless telephone and other product components. In addition, in FIG. 3, the interface to the cradle is represented by block 12. Each of the foregoing functional blocks, the PDA, the MSM, and the cradle need to be interconnected during different times of normal operation of the device. By way of example, and not limitation, the PDA interface is coupled to the cradle interface when operations to back-up or restore the PDA memory are desired. The MSM interface 22 is coupled to the cradle interface 12 when the wireless device is installed in the cradle 14 to extend the functions of the wireless telephone, such as in hands-free operation or programming. Also, the PDA 20 is coupled to the MSM 22 when data are being transferred to and from the PDA 20 via the wireless telephone, through the MSM 22, or when PDA 20 data is being used to control the MSM 22.

In FIG. 3, the interconnection between the PDA port 20, the MSM port 22, and the cradle port 12 is accomplished by use of the omni-directional interface multiplexer 24, in the present invention. This device is characterized by efficient use of the minimum components needed to accomplish the required function, low parts cost, low development costs, and compact size. The multiplexer 24 controls the interconnection of bi-directional signals, in the form of serial communications signals, between the three aforementioned interfaces. The multiplexer 24 is a digital circuit and is under the control of the PDA controller (not shown) in the preferred embodiment. The flow of digital data between the interfaces is illustrated by the three double-headed arrows in FIG. 3. The control of the multiplexer 24 is illustrated by arrow 25 connecting the PDA interface 20 and the multiplexer 24. While the preferred embodiment multiplexer deals with three serial communications ports in a portable wireless device, those of ordinary skill will appreciate that any reasonable number of interfaces, which carry bi-directional signals, may employ the teachings of the present invention. The present invention is readily scalable, as will be more fully discussed hereinafter.

Figure 3A:
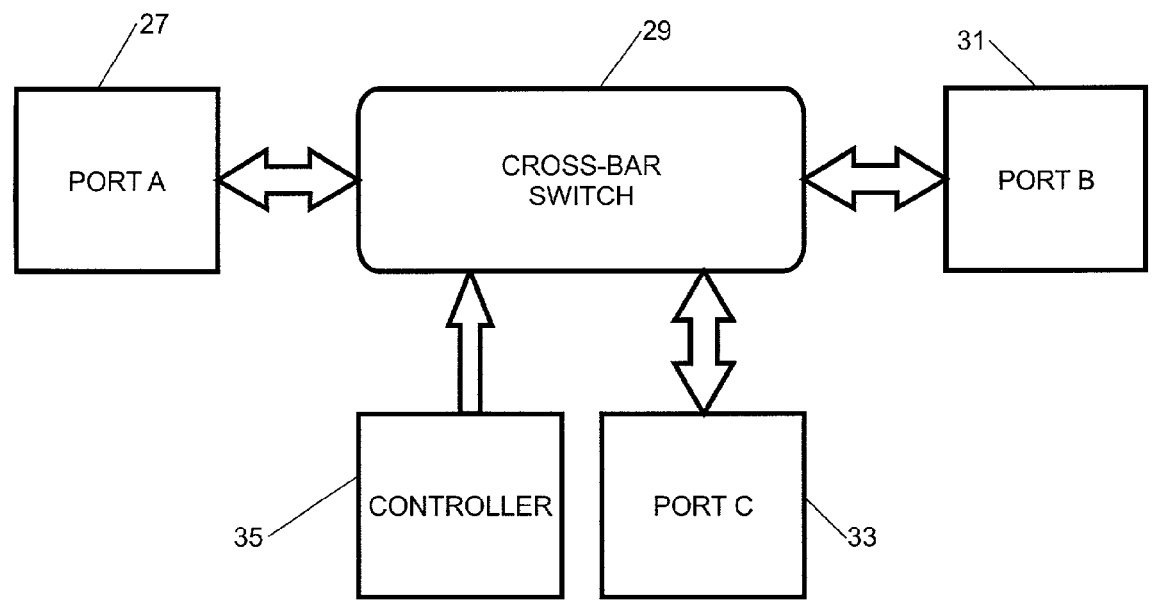
FIG. 3A is a functional block diagram of an illustrative embodiment of the present invention.

In FIG. 3A, a more generalized diagram of the illustrative embodiment from FIG. 3 is shown. In FIG. 3A, the interconnection is accomplished by a cross-bar switch 29. The bi-directional inputs/outputs of cross-bar switch 29 are coupled to port A 27, port B 31, and port C 33. In this illustrative embodiment, the ports are configured to interconnect transmit and receive data, such as used in an RS-232 port, for example. A controller 35 controls the cross-bar switch 29, as is necessary for the system the system using the invention. In the preferred embodiment, this would be a portable communications device, as was described hereinbefore.

Figure 4:
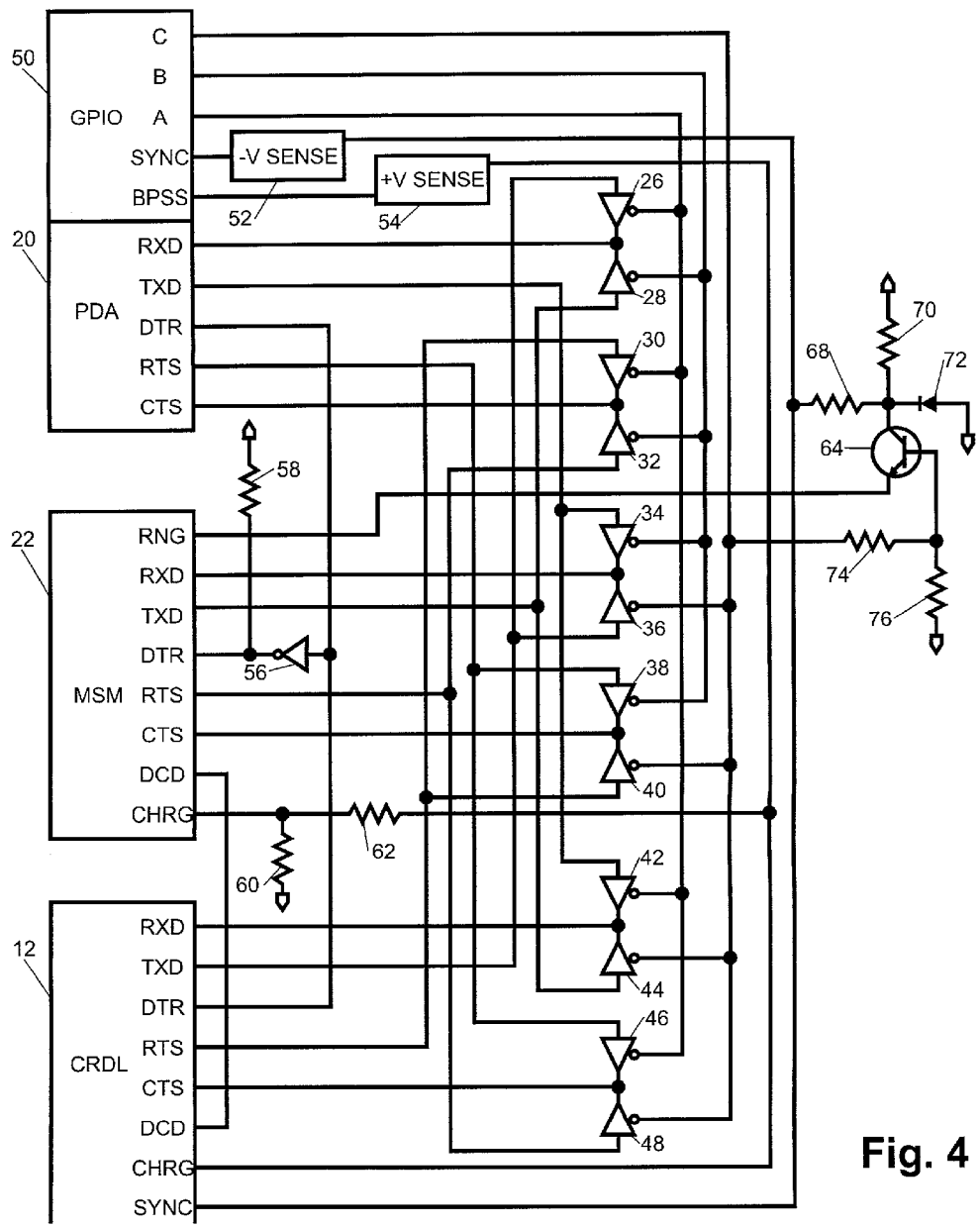
FIG. 4 is a schematic diagram of an illustrative embodiment of the present invention.

Reference is directed to FIG. 4, which is a schematic diagram of the preferred embodiment omni-direction interface multiplexer. The three port interfaces are illustrated and include the PDA port 20, the MSM port 22, and the cradle port ('CRDL') 12. Since the preferred embodiment utilizes RS-232 serial communications between devices, each of the three port interfaces includes the typical RS-232 signals, which are: receive data 'RXD', transmit data 'TXD', data terminal ready 'DTR', request to send 'RTS', and clear to send 'CTS'. The function and purpose of these signal lines is well understood by those of ordinary skill in the art. In addition, the MSM port interface comprises an RS-232 data carrier detect 'DCD' output which is coupled to the cradle port interface 12 so that the external computing device can be informed as to when the MSM is receiving data carrier signals. The other signal interfaces will more discussed hereinafter.

The structure of the preferred embodiment of the present invention includes the twelve non-inverting buffers identified in FIG. 4 as items 26, 28, 30, 32, 34, 36, 38, 40, 42, 42, 44, 46, ad 48. The buffers implement two instances of the present invention. The TXD and RXD RS-232 signal lines are a first output/input pair, and, the RTS and CTS signal lines are a second transmit/receive signal pair. Thus, six buffers are required to implement each instance of the present invention in the preferred embodiment. The buffers each have an input and an output. An output signal, either TXD or RTS is coupled to the input side of a buffer and an input signal, either RXD or CTS is coupled to the output side of a buffer. Each buffer also has a control input. The control input can be enabled or disabled. In the enabled stated, the signal level at the input of a buffer is coupled to the output of the buffer. In the disabled state, the input of the buffer is not coupled to the output. In the preferred embodiment, the output of the buffer is set to a high impedance state when the control input is disabled. This provides the basic advantage that two, or more, outputs can be coupled to a single input such that any one of them can drive the input without being loaded by one of the other outputs, so long as each other outputs is disabled to the high impedance state. In addition, the interface multiplexer can be set to a state where all of the buffers is set to the high impedance state, and no signal are coupled from any interface to any other interface.

In the preferred embodiment illustrated in FIG. 4, there are three interface ports, the PDA 20, the MSM 22, and the cradle interface 12. Thus, there are three interfaces, which may be bi-directionally coupled, any two at a time. In mathematical terms, the interconnection possibilities are the number of ways, or Combinations, of picking two unordered outcomes from three possibilities, also stated as 'three choose two'. Obviously, there are three such possibilities. To control these three possibilities, there are three control output signals from a general purpose input/output (hereinafter 'GPIO') device 50. The GPIO is interfaced to a PDA microcontroller (not shown) in the preferred embodiment, which determines when it is appropriate to make the needed bi-directional interface interconnections. Naturally, the controller could be a separate entity, apart from any one of the interfaces being multiplexed. The three control outputs of GPIO 50 are labeled 'A', 'B', and 'C'. Each of these outputs is a conventional CMOS or TTL level signal output line from a microcontroller, the PDA microcontroller, in the preferred embodiment. By enabling any one of these outputs, a particular one of the three interconnection possibilities is enabled. Also, when all three of the outputs of GPIO 50 are disabled, then none of the buffers are enabled and all of the buffer outputs are disabled to the high impedance state and there is no interconnection between the three interfaces. Stated otherwise, the multiplexer is turned off.

In FIG. 4, as stated earlier, there are two instances of the present invention that operate in parallel. This is necessary because the TXD/RXD and RTS/CTS output/input signal line pairs operate in unison in the RS-232 protocol specification. Therefore, three control outputs from GPIO 50 can control both instances of the present invention in the preferred embodiment. The specifics of the interconnection and operation of the preferred embodiment follow.

Considering first, the multiplexing of the TXD and RXD signals among the PDA 20, the MSM 22, and the cradle 12 interfaces, each RXD signal lines has the output of two buffers coupled to it. In the PDA 20, the output of buffers 26 and 28 are coupled to RXD. In the MSM 22, the output of buffers 34 and 36 are coupled to RXD. In the cradle 12, the output of buffers 42 and 44 are coupled to RXD. For each interface, the TXD signal is coupled to the input side of one of the buffers coupled to the other two interfaces. Specifically, the TXD signal from the PDA is coupled to the input buffer 34, which couples to RXD on MSM 22, and the input of buffer 42, which couples to RXD on cradle 12. Similarly, the TXD signal from the MSM is coupled to the input buffer 28, which couples to RXD on PDA 20, and the input of buffer 44, which couples to RXD on cradle 12. And, the TXD signal from the cradle 12 is coupled to the input buffer 26, which couples to RXD on PDA 20, and the input of buffer 36, which couples to RXD on MSM 22. The control output labeled 'A' on GCIO 50 is coupled to the control input of buffers 26 and 42. Therefore, when the signal on control output A is enabled, so are buffers 26 and 42. Buffer 26 couples the TXD on cradles 12 to the RXD on PDA 20, and, buffer 42 couples the TXD on PDA 20 to the RXD on cradle 12. Thus, enabling control output A establishes a bi-directional communications path between PDA 20 and cradles 12. The control output labeled 'B' on GPIO 50 is coupled to the control input of buffers 28 and 34. Therefore, when the signal on control output B is enabled, so are buffers 28 and 34. Buffer 28 couples the TXD on MSM 22 to the RXD on PDA 20, and, buffer 34 couples the TXD on PDA 20 to the RXD on MSM 20. Thus, enabling control output B establishes a bi-directional communications path between PDA 20 and MSM 20. The control output labeled 'C' on GPIO 50 is coupled to the control input of buffers 36 and 44. Therefore, when the signal on control output C is enabled, so are buffers 36 and 44. Buffer 36 couples the TXD on cradle 12 to the RXD on MSM 22, and, buffer 44 couples the TXD on MSM 22 to the RXD on cradle 12. Thus, enabling control output C establishes a bi-directional communications path between cradle 12 and MSM 20.

The interconnection of the RTS and CTS signals on PDA 20, MSM 22, and cradle 12 through buffers 30, 32, 38, 40, 46, and 48, with control signals A, B, and C from GPIO 50 are the same functionally as was just described respecting the TXD and RXD signals, so the details will not be reduced to words here. For a thorough understanding, please refer to FIG. 4, which details the interconnections.

Those of ordinary skill in the art will appreciate that the circuitry illustrated in FIG. 4 will benefit from the use of pull-up resistors (not shown) at each of the inputs of the multiplexer components. These serve two beneficial purposes. First, they establish valid logical signal levels at the multiplexor inputs when not otherwise driven by one of the other ports. Second, they establish valid logical signal levels when all of the multiplexor buffers are set to the high-impedance state (or "tri-stated").

Respecting the remaining circuitry detailed in FIG. 4, these are used primarily to deal with the differing RS-232 voltage levels. Those of ordinary skill in the art understand that the RS-232 interface specification does not specify an exact operating voltage. The cradle 12 operates with both positive (plus twelve volts) and negative (minus 3 to minus 12 volts) signals. Resistors 62 and 60 establish a voltage divider so that the plus twelve volt charge signal output on the 'CHRG' line of cradle 12 does not create an over-voltage situation at the 'CHRG' input of MSM 22. Buffer 56 and resistor 58 serve to isolate the 'DTR' input of MSM 22 from the rest of the circuit when MSM 22 is powered-off in a standby state. The −V SENSE 52 and +V SENSE 54 bocks convert the higher voltages output from cradle 12 to the CMOS voltages required in the portable device through GPIO 50. Transistor 64 and it related components serve to isolate the MSM interface from the other circuitry when the MSM is turned off. The 'RNG' signal output from MSM 22 indicates that a call is coming into the device. The 'C' signal output from the GPIO 50 sets the multiplexer into an MSM 22 to cradle 12 bi-directional communications mode. When RNG goes active (low), transistor 64 turns on, so the RNG signal is disconnected from the cradle 12, Unless C is active, and then the RNG signal is coupled though to the cradle 12. Resistor 74, 76, 68, and 70 are used to bias and isolate the transistor, as is understood by those of ordinary skill in the art. Diode 72 serves to clamp negative going signals to ground when the RS-232 signals fall below a safe level for the portable device.

The foregoing preferred embodiment implements three interface multiplexing for selected bi-directional communications with two communications lines pairs (TXD/RXD and CTS/RTS). However, it is to be understood that the preset invention is readily scalable depending on the number of interfaces as well as the number of communication line pairs. The general case is for 'n' interface ports interconnected two at a time. Where the number of communications line pairs is more than one, the circuitry is multiplied and the control signals are shared, as was described respecting the preferred embodiment. The general mathematical expression is for a Combination of sub-elements taken from a set of elements as follows:

$$_nC_k = n!/(k!(n-k)!)$$

Read 'n choose k', where n is the number of interfaces and k is the number of interfaces interconnected at one time.

The number of possible combinations is the number of control outputs required to operate the multiplexer. If there are n interfaces, then each input of each interface naturally requires (n−1) buffers be coupled to it, so that each other interface can be coupled thereto. Also, the total number of buffers required for the multiplexer will be n multiplied by (n−1). Taking all this into consideration, and solving for various values of n and setting k equal to two, we have the following:

| Number of Interfaces | Number of Interconnections/ Control Lines | Number of Buffers |
| --- | --- | --- |
| 3 | 3 | 6 |
| 4 | 6 | 12 |
| 5 | 10 | 20 |
| 6 | 15 | 30 |

Figure 5A:
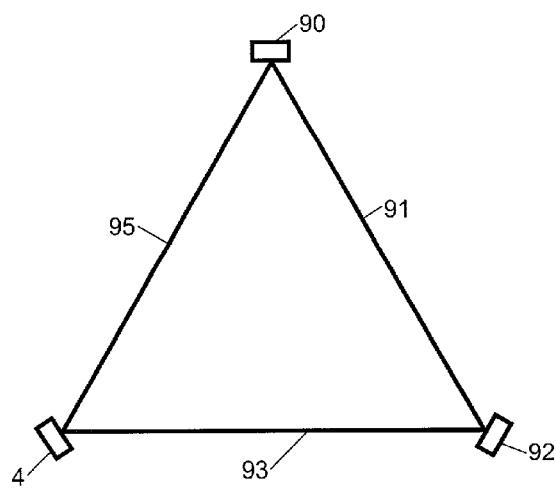
FIG. 5A is a diagram of a three-interface implementation an illustrative embodiment of the present invention.
Figure 5B:
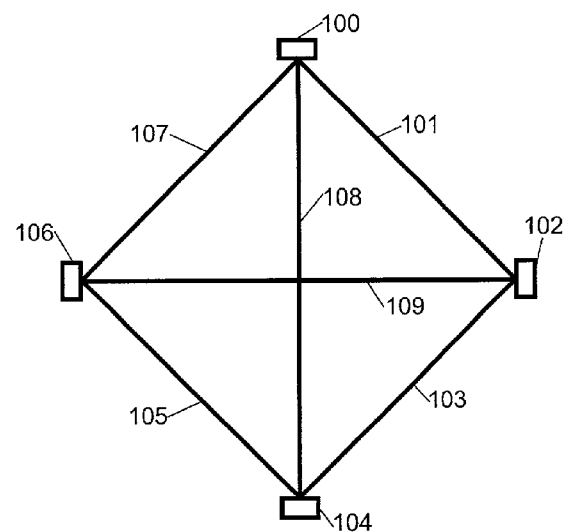
FIG. 5B is a diagram of a four-interface implementation an illustrative embodiment of the present invention.
Figure 5C:
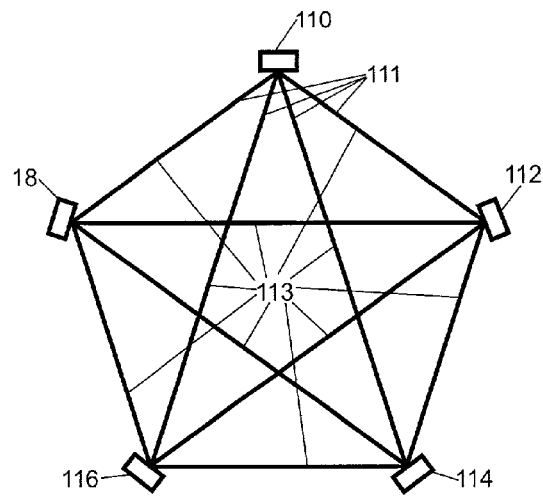
FIG. 5C is a diagram of a five-interface implementation an illustrative embodiment of the present invention.
Figure 5D:
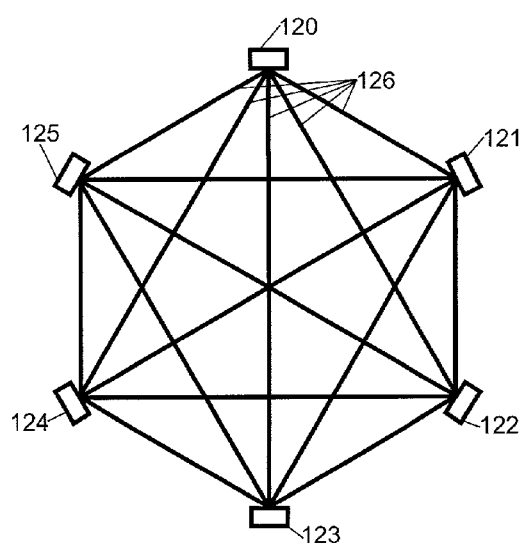
FIG. 5D is a diagram of a six-interface implementation an illustrative embodiment of the present invention.

The forgoing is graphically represented in FIGS. 5A, 5B, 5C, and 5D. FIG. 5A depicts three interfaces 90, 92, and 94. There are three possible connections 91, 93, and 95. Therefore, the multiplexer requires three control lines to select the three possibilities. Each interface requires two buffers to couple the outputs of the other two interfaces to the input of the selected interface (n−1). In FIG. 5B, there are four interfaces, 100, 102, 104, and 106. These can be interconnected in six combinations as shown by lines 101, 103, 105, 107, 108, and 109. Each interface has three interconnection lines coupled to it, so three buffers are required for each. Thus, six control lines and twelve buffers are required in all. In FIG. 5C, there are five interfaces, 110, 112, 114, 116, and 118. Each interface has four lines 111 coupled to it so four buffers are required for each interface. There are ten possible interconnection pairs 113. Thus, ten control lines and twenty buffers are required to implement the present invention. In FIG. 5D, there are six interfaces, 120, 121, 122, 123, 124, and 125. Each interface has five interconnections 126 coupled to it, and there are a total of fifteen interconnection possibilities. Therefore, fifteen control outputs and thirty buffers are required.

While the numbers of control lines and buffers grow as the number of interface ports increases, the cost to implement the present invention remains low. In the preferred embodiment the buffers used are packaged as six buffers to a package (Toshiba TC74CHC367 hex-buffers are used). The control lines are available either directly from a micrcontroller or may be demultiplexed from a smaller number of micrcontroller control lines. Thus, in the case of three or four interfaces, two buffer packages are required. In the case of five interfaces, four buffer packages are required. In the case of six interfaces, five buffer packages are required. Because the cost is so low, and the printed circuit board area required for these packages are so small, it is very economical to implement an omni-directional interface multiplexer of the present invention.

Thus, the present invention has been described herein with reference to a particular embodiment for a particular application. It is therefore intended by the appended claims to cover any and all such applications, modifications and embodiments within the scope of the present invention. Accordingly,

What is claimed is:

1. An apparatus, comprising:
    first, second, and third interfaces each having an input and an output;
    an interface controller having a first, second, and third control outputs, and operable to enable any one of said outputs individually;
    a first, second, third, fourth, fifth, and sixth buffers, each of the buffers having an input, an output, and a single control input, and wherein said single control inputs enable and disable the coupling of signals through said buffers, and wherein
    said output of said first and second buffers are coupled to said input of said first interface;
    said outputs of said third and fourth buffers are coupled to said input of said second interface;
    said outputs of said fifth and sixth buffers are coupled to said input of said third interface;
    said output of said first interface is coupled to said inputs of said fourth and fifth buffers;
    said output of said second interface is coupled to said inputs of said first and sixth buffers;
    said output of said third interface is coupled to said inputs of said second and third buffers;
    said first control output is coupled to both of said single control inputs of said first and fourth buffers to selectively enable bi-directional interconnection of the first interface and second interface;
    said second control output is coupled to both of said single control inputs of said third and sixth buffers to selectively enable bi-directional interconnection of the second interface and third interface, and
    said third control output is coupled to both of said single control inputs of said second and fifth buffers to selectively enable bi-directional interconnection of the first interface and third interface.

2. The apparatus of claim 1 including means for disabling said control inputs by setting said outputs of said buffers to a high impedance state, and wherein said interface controller is operable to disable all of said control outputs.

3. The apparatus of claim 1 wherein said interfaces are serial port interfaces.

4. The apparatus of claim 3 wherein said serial port interfaces are RS-232 serial port interfaces.

5. The apparatus of claim 4 wherein said output of each said serial port interface is a request to send output, and said input of each said serial port interface is a clear to send input.

6. The apparatus of claim 3 wherein said output of each said serial port interface is a transmit data output, and said input of each said serial port interface is a receive data input.

7. The apparatus of claim 1 wherein said interface controller is incorporated into one of said interfaces.

8. An apparatus, comprising:
    a plurality of n interfaces, each having an input and an output;
    a plurality of n(n−1) buffers, each having an input, an output, and a control input, and wherein said control inputs enable and disable the coupling of signals through said buffers, respectively;
    an interface controller having a plurality of $(_nC_2)$ control outputs, and operable to enable any one of said plurality of outputs individually, and wherein
    said outputs of a unique (n−1) of said plurality of buffers are coupled to said input of each one of said plurality of interfaces;
    every one of said outputs of said plurality of interfaces is uniquely coupled to said input of one of said (n−1) plurality of buffers that are coupled to said inputs of every other of said plurality of interfaces, such that said output of every interface is coupled to said input of every other interface through a unique one of said plurality of buffers, and
    each one of said plurality of control outputs is coupled to said control inputs of the two of said plurality of buffers that couples a unique pair of the $(_nC_2)$ combinations of said interface inputs and outputs.

9. The apparatus of claim 8 wherein disabling said control inputs includes setting said outputs of said plurality of buffers to a high impedance state, and wherein said interface controller is operable to disable all of said plurality of control outputs.

10. The apparatus of claim 8 wherein said plurality of interfaces are serial port interfaces.

11. The apparatus of claim 10 wherein said serial port interfaces are RS-232 serial port interfaces.

12. The apparatus of claim 11 wherein said output of said serial port interface is a request to send output, and said input of said serial port interface is a clear to send input.

13. The apparatus of claim 10 wherein said output of said serial port interface is a transmit data output, and said input of said serial port interface is a receive data input.

14. The apparatus of claim 8 wherein said interface controller is incorporated into one of said interfaces.

* * * * *